(12) United States Patent
Herron

(10) Patent No.: US 12,268,992 B2
(45) Date of Patent: Apr. 8, 2025

(54) METHODS AND SYSTEMS FOR REDUCING MAGNESIUM IN HIGH SALINITY SALAR BRINES BY NANOFILTRATION AND FORWARD OSMOSIS

(71) Applicant: FLUID TECHNOLOGY SOLUTIONS (FTS) INC., Albany, OR (US)

(72) Inventor: John R. Herron, Corvallis, OR (US)

(73) Assignee: FLUID TECHNOLOGY SOLUTIONS (FTS) INC., Albany, OR (US)

( * ) Notice: Subject to any disclaimer, the term of this patent is extended or adjusted under 35 U.S.C. 154(b) by 427 days.

(21) Appl. No.: 17/774,667

(22) PCT Filed: Nov. 4, 2020

(86) PCT No.: PCT/US2020/058879
§ 371 (c)(1),
(2) Date: May 5, 2022

(87) PCT Pub. No.: WO2021/092013
PCT Pub. Date: May 14, 2021

(65) Prior Publication Data
US 2022/0401885 A1 Dec. 22, 2022

Related U.S. Application Data

(60) Provisional application No. 62/931,473, filed on Nov. 6, 2019.

(51) Int. Cl.
*B01D 61/00* (2006.01)
*B01D 61/02* (2006.01)
(Continued)

(52) U.S. Cl.
CPC ............ *B01D 61/08* (2013.01); *B01D 61/005* (2013.01); *B01D 61/027* (2013.01); *B01D 61/58* (2013.01);
(Continued)

(58) Field of Classification Search
CPC ................ B01D 61/005; B01D 61/027; B01D 2311/2673; C22B 26/12
See application file for complete search history.

(56) References Cited

U.S. PATENT DOCUMENTS

| | | | |
|---|---|---|---|
| 2015/0014248 A1 | 1/2015 | Herron et al. |
| 2018/0245180 A1 | 8/2018 | Cheng et al. |
| 2018/0353907 A1 | 12/2018 | Switzer et al. |

FOREIGN PATENT DOCUMENTS

| | | | |
|---|---|---|---|
| CN | 106334445 A | * | 1/2017 |
| CN | 109607578 A | | 4/2019 |
| CN | 108359813 B | | 10/2019 |

OTHER PUBLICATIONS

Wang—CN 108359813 A machine translation (Year: 2018).*
(Continued)

*Primary Examiner* — Bradley R Spies
(74) *Attorney, Agent, or Firm* — Dorsey & Whitney LLP

(57) ABSTRACT

Methods and systems of lowering a concentration of divalent cations in lithium-containing brines are described. A method includes diluting saturated salar brine such that sodium chloride concentration is at most about 80% of saturation. The method also includes feeding the diluted salar brine to a high pressure nanofiltration system operating at pressure above about 60 bar effective to form a permeate and a concentrate. The method also includes collecting the permeate having a lower concentration of divalent cations relative to the saturated salar brine.

14 Claims, 2 Drawing Sheets

(51) Int. Cl.
    *B01D 61/08*     (2006.01)
    *B01D 61/58*     (2006.01)
    *C22B 3/22*     (2006.01)
    *C22B 26/12*     (2006.01)

(52) U.S. Cl.
    CPC ............... *C22B 3/22* (2013.01); *C22B 26/12* (2013.01); *B01D 2311/06* (2013.01); *B01D 2311/2673* (2013.01)

(56) References Cited

OTHER PUBLICATIONS

Li—CN 109607578 A machine translation (Year: 2019).*
Wang '445—CN 106334445 A machine translation (Year: 2017).*
International Search Report and Written Opinion from International Application No. PCT/US2020/058879 mailed Mar. 18, 2021.
U.S. Appl. No. 62/931,473, filed Nov. 6, 2019.
Saltworks Technologies , "Lithium Brine Extraction Technologies & Approaches", https://cdn.saltworkstech.com/wp-content/uploads/2018/06/Lithium-Brine-Extraction-Technologies-and-Approaches.pdf, 2018, 6 pages.

* cited by examiner

METHODS AND SYSTEMS FOR REDUCING MAGNESIUM IN HIGH SALINITY SALAR BRINES BY NANOFILTRATION AND FORWARD OSMOSIS

CROSS-REFERENCE TO RELATED APPLICATIONS

This application claims priority to U.S. Provisional Patent Application No. 62/931,473, filed on Nov. 6, 2019, the disclosure of which is incorporated herein, in its entirety, by this reference.

BACKGROUND

Recovery of metals in the salt form from naturally occurring brines is common. Much of the world's potassium is recovered from brines and, recently, extracting lithium has been of interest. One of the major sources of lithium is from salar fields in the Andes mountains.

Salar fields occur in high altitude depressions in the central Andes. The region is very arid, so water that runs off the surrounding mountains collects in the depression and evaporates. Dissolved salts in the run-off have accumulated to create salt fields where most salts are in the solid form. Groundwater below the salt layer is highly saline and, lithium, being highly soluble, remains mostly in solution. The salar field has naturally concentrated the lithium in the groundwater relative to other ions in the run-off water. In many salars, the lithium in the groundwater is around one gram per kilogram solution.

As an example, the salt concentration of groundwater from the Salar de Altacama, Chile, is shown below in Table 1.

TABLE 1

Salt concentrations (g/kg) in groundwater from Salar de Altacama

| Na | Cl | K | Mg | Ca | $SO_4$ | B | Li |
|---|---|---|---|---|---|---|---|
| 90 | 190 | 24 | 10 | 0.5 | 0 | 0.4 | 1.6 |

The production of lithium from this groundwater is by solar evaporation. The groundwater is pumped into open ponds where the water evaporates. Since the groundwater is saturated in NaCl, as water evaporates NaCl crystalizes on the bottom of the ponds. Eventually the potassium level in solution rises to saturation and carnallite ($KMgCl_3$) begins to crystalize. This is collected for the potassium value.

Once the lithium in solution is in the range of 10 to 40 g/L, $Na_2CO_3$ is added which causes lithium carbonate to precipitate. At November 2019 market prices, lithium carbonate has a value of 8,000/ton. There are industrial methods of extracting lithium from ores but the extraction from salars such as the Altacama is far cheaper.

Increasing production in the salar fields has been limited by water scarcity and the chemistry of some salars.

Water scarcity is the reason the salar fields exist. The salar depressions never became lakes because the run-off into them was low enough that water entering from streams all evaporated. Extraction of groundwater entails drilling below the salars and drawing down the water table. A consequence of this is the groundwater in the surrounding terrain is also lowered, and the vegetation in the neighboring countryside is impacted. There are increasing restrictions being placed on the amount of water which can be extracted from the salars currently in production.

Many salars which contain a large amount of lithium are not currently in production because the level of magnesium in the brine is too high to make extracting lithium practical. An example is the Salar di Uyuni, Bolivia, provided in Table 2, below.

TABLE 2

Salt concentrations (g/kg) in salar brine from Salar di Uyuni, Bolivia

| Na | Cl | K | Mg | Ca | $SO_4$ | B | Li |
|---|---|---|---|---|---|---|---|
| 100 | 190 | 16 | 17 | 3 | 22 | 0.7 | 0.8 |

The reason salars like this are not in production is the ratio of magnesium to that of potassium and lithium. During evaporation, when the precipitation of carnallite occurs, if the molarity of magnesium is near that or above the molarity of potassium, lithium carnallite ($LiMgCl_3$) precipitates along with the potassium carnallite. The solution then never reaches 10 g/L Li and it is not economical to recover the lithium.

There are chemical methods to remove magnesium before evaporation, but they are expensive. One proposal is to add lime (CaO) to the feed to precipitate $Mg(OH)_2$. The added calcium is then precipitated with $Na_2SO_4$, then residual calcium is precipitated with oxalic acid.

SUMMARY

Embodiments of methods and systems of lowering a concentration of divalent cations in lithium-containing brines are described. A method includes diluting saturated salar brine such that sodium chloride concentration is at most about 80% of saturation. The method also includes feeding the diluted salar brine to a high pressure nanofiltration system operating at pressure above about 60 bar effective to form a permeate and a concentrate (or retentate). The method also includes collecting the permeate having a lower concentration of divalent cations relative to the saturated salar brine.

In an embodiment, a method of lowering a concentration of divalent cations includes providing a lithium-containing salar brine having a first concentration of one or more divalent cations. The method also includes filtering the lithium-containing salar brine in a high pressure nanofiltration system effective to form a permeate and a concentrate. The method also includes collecting the permeate having a second concentration of the one or more divalent cations that is less than the first concentration of the one or more divalent cations.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Embodiments disclosed herein are directed to use of high pressure nanofiltration to produce a high salinity, salar brine which is substantially reduced in at least one (e.g. both) of calcium and magnesium with minimal chemical addition.

In an embodiment, a method of high pressure nanofiltration to lower a concentration of divalent cations in lithium-containing brines includes: diluting saturated salar brine so that sodium chloride concentration is at most about 80% of saturation. In some embodiments, if necessary, the method may further include diluting the saturated salar brine so that a combined osmotic partial pressure of calcium and magnesium chloride is less than 50 bar. The method also may include feeding the diluted brine to a high pressure nanofiltration system operating at pressure above about 60 bar, such as about 80 bar. The method also may include collecting permeate from the feeding step for evaporative harvesting of lithium. The method also may include returning the concentrate from the feeding step to the salar to replenish the water table. In an embodiment, the permeate from the high pressure nanofiltration has a concentration of divalent cations, particularly magnesium, reduced to a level that the magnesium molarity is lower than the potassium molarity and lithium is not lost during the precipitation of carnallite. In an embodiment, the method further includes enhancing the evaporation of the permeate by concentrating the permeate with forward osmosis before introducing the brine to the evaporation ponds, wherein the draw solution for the forward osmosis process is the brine taken directly from the salar.

The process of high pressure nanofiltration to concentrate salt brines is discussed in US patent application 20150014248 to Herron et al. (Herron), which is incorporated herein, in its entirety, by this reference. Herron describes the equipment and transport equations pertinent to the concentration of single component brines to osmotic pressures higher than the applied osmotic pressure.

The separation of monovalent ions from a mixture of monovalent and divalent ions also may involve pressure driven transport across a nanofiltration membrane from solutions with osmotic pressures above the applied pressure. The proposed process, however, may be targeted at the separation of cations rather than increasing concentration of a single species.

Figure 1:
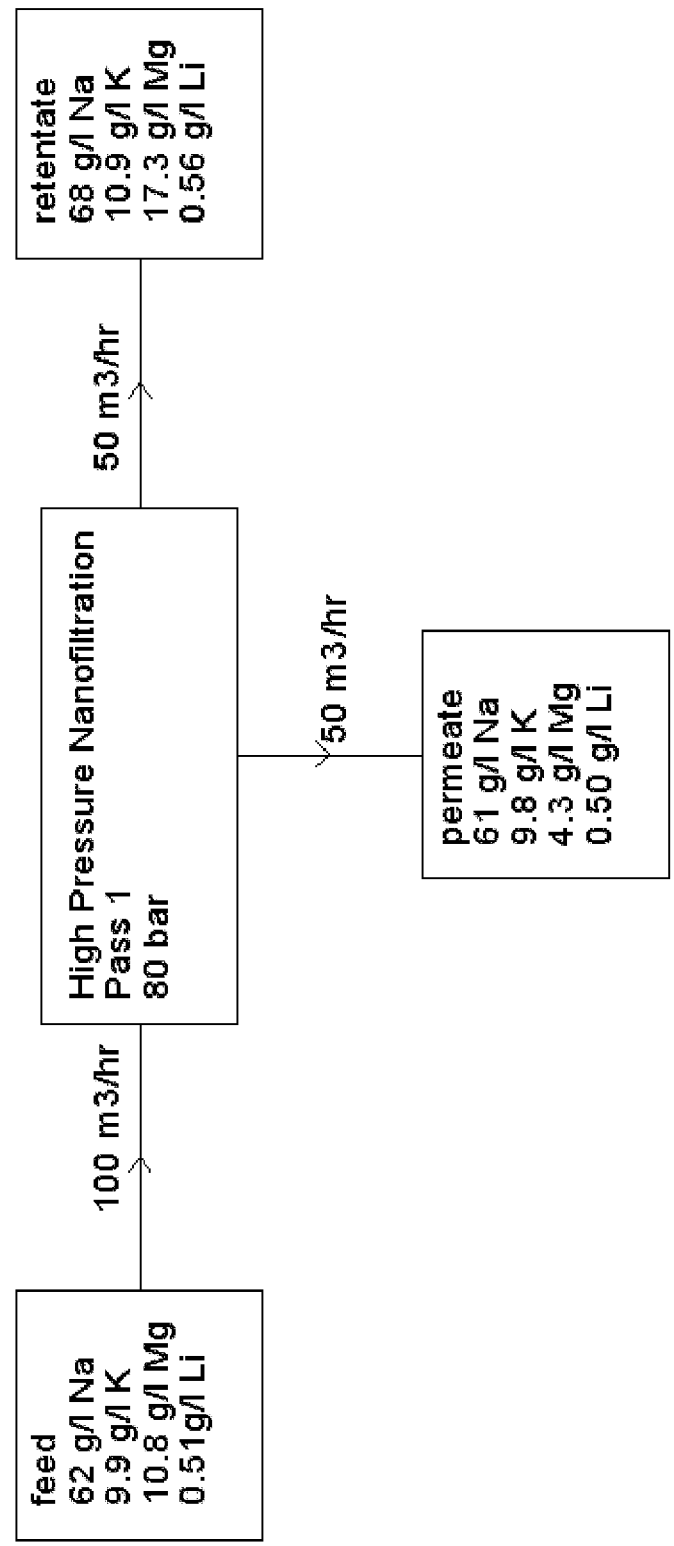
FIG. 1 is a schematic of a system for high pressure nanofiltration of slightly diluted high magnesium salar brine, according to an embodiment.

The high pressure nanofiltration elements described in Herron have transport of monovalent cations ($Na^+$, $K^+$, $Li^+$) 14 times faster than that of divalent cations ($Mg^{++}$, $Ca^{++}$). FIG. 1 is a schematic of a system for high pressure nanofiltration of slightly diluted high magnesium salar brine. The system of FIG. 1 may utilize the faster transport of monovalent cations than divalent cations to reduce the proportion of Mg in the salar brine.

Example laboratory tests showed the transport parameter for divalent cations is about 7% of that of monovalent cations for high pressure nanofiltration membranes used at the salt strengths in the application.

In FIG. 1, the feed is based on the measured values of salts in the Salar de Uyuni, Bolivia. The salar brine has been diluted for two reasons: it is saturated in sodium chloride and the osmotic potential of the magnesium chloride in solution is high. In some embodiments, to avoid scaling, the high pressure nanofiltration retentate may not exceed 85% of saturation for any species. Also, since the applied pressure is only 80 bar, if the osmotic partial pressure of the magnesium chloride reaches 80 bar during the process, the separation of monovalent ions from divalent ions stops.

The retentate from the process in FIG. 1 may be returned to salar field to replenish the ground water.

In the permeate brine, the concentration of magnesium may be reduced to the point where its molarity is somewhat lower than the molarity of potassium. The permeate brine can be fed to the evaporation ponds and, during evaporative concentration, the magnesium will fall as potassium carnallite and the lithium will be available for capture.

Figure 2:
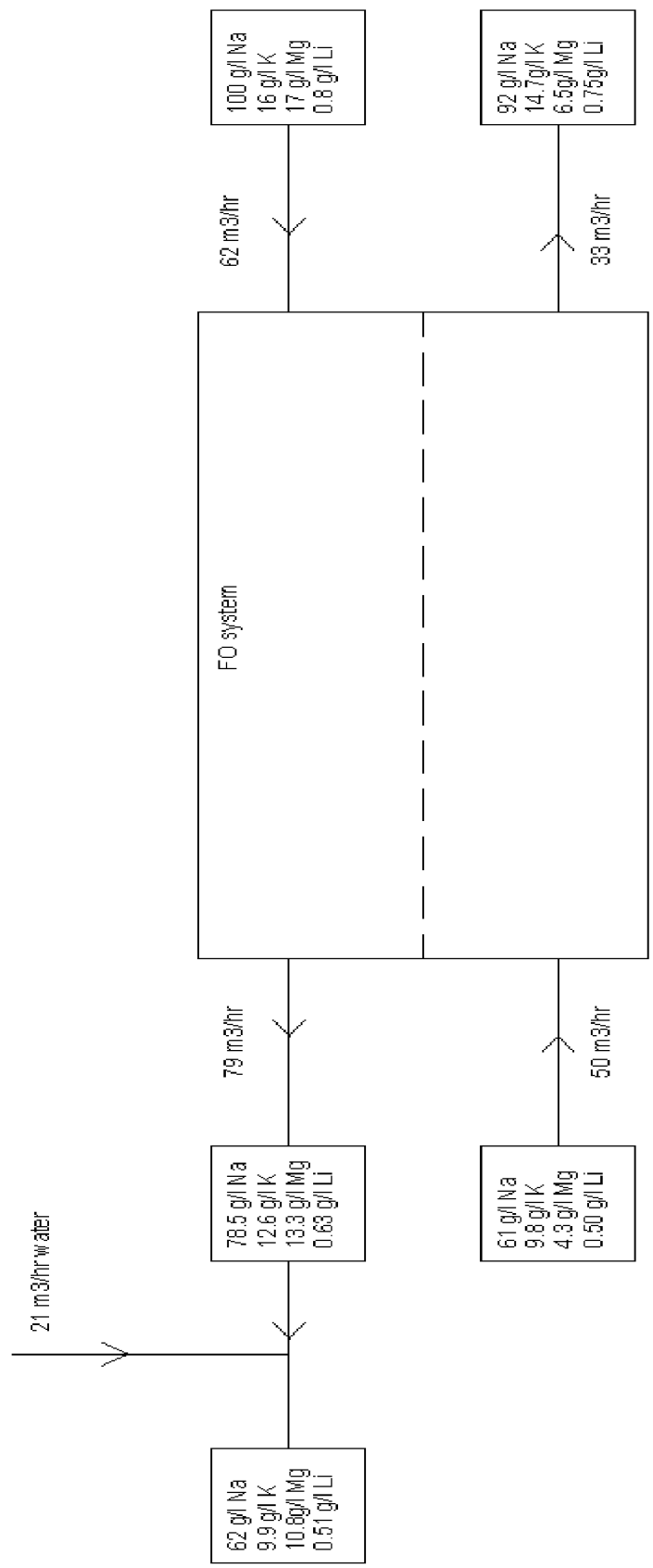
FIG. 2 is a schematic of a system for forward osmosis concentration of permeate from high pressure nanofiltration, according to an embodiment.

The dilution water for the process is a problem in Andean salars. To recover some of the water and make the feed water to the brine ponds closer to saturation, the permeate brine may be concentrated with forward osmosis, using the brine from the salar as the draw solution. For example, FIG. 2 shows a schematic of a system for forward osmosis concentration of permeate from high pressure nanofiltration, according to an embodiment.

Pumping energy for the nanofiltration and forward osmosis is about 6 KWH/$m^3$ of final forward osmosis concentrate, assuming energy recovery from the nanofiltration retentate.

In some embodiments, a method of lowering a concentration of divalent cations includes providing a lithium-containing salar brine having a first concentration of one or more divalent cations. The one or more divalent cations may include at least magnesium. The method also may include diluting the lithium-containing salar brine such that sodium chloride concentration is at most about 80% of saturation. In some embodiment, the lithium-containing salar brine may be diluted such that the sodium chloride concentration may be at most about 90%, at most about 85%, at most about 75%, at most about 70%, at most about 65%, or at most about 60% of saturation. In some embodiments, the method may include further diluting the lithium-containing salar brine such that a combined osmotic partial pressure of calcium and magnesium chloride in the lithium-containing salar brine is less than about 50 bar. In some embodiments, the combined osmotic partial pressure of calcium and magnesium chloride in the lithium-containing salar brine is less than about 70 bar, less than about 65 bar, less than about 60 bar, less than about 55 bar, less than about 45 bar, less than about 40 bar, less than about 35 bar, or less than about 30 bar.

The method of lowering a concentration of divalent cations also may include filtering the lithium-containing salar brine in a high pressure nanofiltration system effective to form a permeate and a retentate. Filtering may include any aspect of high pressure nanofiltration discussed in US patent application 20150014248 to Herron et al. (Herron), which is incorporated herein, in its entirety, by this reference. In some embodiments, filtering the lithium-container salar brine includes filtering the lithium-container salar brine in the high pressure nanofiltration system at a pressure of at least about 60 bar, such as at least about 65 bar, at least about 70 bar, at least about 75 bar, at least about 80 bar, at least about 85 bar, at least about 90 bar, at least about 95 bar, or at least about 100 bar.

The method also may include collecting the permeate, with the permeate having a second concentration of the one or more divalent cations that is less than the first concentration of the one or more divalent cations. In some embodiments, the second concentration of magnesium is at least about 50% less than the first concentration of magnesium. In some embodiments, the second concentration of magnesium is at least about 30%, at least about 35% less, at least about 40% less, at least about 45% less, at least about 55% less, at least about 60% less, at least about 65% less, or at least about 70% less than the first concentration of magnesium. The method also may include evaporative harvesting lithium from the permeate. In some embodiments, evaporative harvesting may be enhanced by concentrating the permeate with a forward osmosis process before introducing the permeate to evaporation ponds used in the evaporative harvesting. These evaporation ponds may include ponds similar to ponds used in producing salar brine. The draw solution for the forward osmosis process is the lithium-containing salar brine.

While various aspects and embodiments have been disclosed herein, other aspects and embodiments are contemplated. The various aspects and embodiments disclosed herein are for purposes of illustration and are not intended to be limiting. Terms of degree (e.g., "about," "substantially," "generally," etc.) indicate structurally or functionally insignificant variations. In an example, when the term of degree is included with a term indicating quantity, the term of degree is interpreted to mean±10%, ±5%, +2% or 0% of the term indicating quantity.

The invention claimed is:

1. A method lowering a concentration of divalent cations in lithium-containing brines, the method comprising:
   diluting saturated salar brine such that sodium chloride concentration is at most about 80% of saturation;
   feeding the diluted salar brine to a high pressure nanofiltration system operating at pressure above about 60 bar effective to form a permeate and a concentrate;
   collecting the permeate having a lower concentration of divalent cations relative to the saturated salar brine;
   evaporative harvesting lithium from the permeate; and
   enhancing the evaporation of the permeate by concentrating the permeate with a forward osmosis process before introducing the permeate to evaporation ponds, wherein the draw solution for the forward osmosis process is the saturated salar brine taken directly from the salar.

2. The method of claim 1, further comprising further diluting the saturated salar brine such that a combined osmotic partial pressure of calcium and magnesium chloride in the diluted salar brine being fed to the high pressure nanofiltration system is less than about 50 bar.

3. The method of claim 1, wherein the permeate from the high pressure nanofiltration has the concentration of divalent cations reduced to a molarity level that is lower than a potassium molarity level and lithium is not lost during precipitation of carnallite.

4. The method of claim 3, wherein the permeate from the high pressure nanofiltration has a concentration of magnesium divalent cations reduced to a magnesium molarity level that is lower than the potassium molarity level.

5. The method of claim 1, wherein feeding the diluted salar brine to a high pressure nanofiltration system operating at pressure above about 60 bar includes feeding the diluted salar brine to the high pressure nanofiltration system operating at pressure above about 80 bar.

6. The method of claim 1, further comprising returning the concentrate to the salar.

7. A method of lowering a concentration of divalent cations, the method comprising:
   providing a lithium-containing salar brine having a first concentration of one or more divalent cations;
   filtering the lithium-containing salar brine in a high pressure nanofiltration system effective to form a permeate and a retentate;
   collecting the permeate having a second concentration of the one or more divalent cations that is less than the first concentration of the one or more divalent cations;
   evaporative harvesting lithium from the permeate; and
   enhancing the evaporation of the permeate by concentrating the permeate with a forward osmosis process before introducing the permeate to evaporation ponds, wherein the draw solution for the forward osmosis process is the lithium-containing salar brine.

8. The method of claim 7, wherein the one or more divalent cations includes at least magnesium.

9. The method of claim 8, wherein the second concentration of magnesium is at least about 50% less than the first concentration of magnesium.

10. The method of claim 7, wherein filtering the lithium-containing salar brine includes filtering the lithium-containing salar brine in the high pressure nanofiltration system at a pressure of at least about 60 bar.

11. The method of claim 10, wherein filtering the lithium-containing salar brine in the high pressure nanofiltration system at a pressure of at least about 80 bar.

12. The method of claim 7, further comprising diluting the lithium-containing salar brine such that sodium chloride concentration is at most about 80% of saturation.

13. The method of claim 7, further comprising further diluting the lithium-containing salar brine such that a combined osmotic partial pressure of calcium and magnesium chloride in the lithium-containing salar brine is less than about 50 bar.

14. The method of claim 7, wherein the one or more divalent cations includes at least calcium.

* * * * *